United States Patent
van der Merwe

(10) Patent No.: US 10,327,398 B2
(45) Date of Patent: Jun. 25, 2019

(54) HIGH DENSITY SOILLESS PLANT GROWTH SYSTEM AND METHOD

(71) Applicant: E-SMARTS GLOBAL LICENSING LTD, Ebene (MU)

(72) Inventor: Pieter Gideo van der Merwe, Pretoria (ZA)

(73) Assignee: E-SMARTS GLOBAL LICENSING LTD, Ebene (MU)

( * ) Notice: Subject to any disclaimer, the term of this patent is extended or adjusted under 35 U.S.C. 154(b) by 0 days.

(21) Appl. No.: 15/038,959

(22) PCT Filed: Apr. 24, 2015

(86) PCT No.: PCT/ZA2015/000029
§ 371 (c)(1),
(2) Date: Apr. 11, 2017

(87) PCT Pub. No.: WO2016/138545
PCT Pub. Date: Sep. 1, 2016

(65) Prior Publication Data
US 2017/0339854 A1    Nov. 30, 2017

(30) Foreign Application Priority Data
Feb. 23, 2015    (ZA) .................................. 2015/1200

(51) Int. Cl.
*A01G 31/00* (2018.01)
*A01G 31/06* (2006.01)
(Continued)

(52) U.S. Cl.
CPC ........... *A01G 31/06* (2013.01); *A01G 9/1438* (2013.01); *A01G 9/18* (2013.01); *A01G 9/24* (2013.01);
(Continued)

(58) Field of Classification Search
CPC .......... A01G 9/022; A01G 9/023; A01G 9/18; A01G 9/24; A01G 2031/006; A01G 31/02
See application file for complete search history.

(56) References Cited

U.S. PATENT DOCUMENTS

| 8,713,850 B2 | 5/2014 | Seebo |
| 2012/0167460 A1 | 7/2012 | Omidi |

(Continued)

FOREIGN PATENT DOCUMENTS

| CN | 104206199 | 12/2014 |
| EP | 0 301 362 | 2/1989 |

(Continued)

OTHER PUBLICATIONS

Examination Report No. 1 dated Aug. 24, 2017, of corresponding Australian Application No. 2015358636.

(Continued)

*Primary Examiner* — Trinh T Nguyen
(74) *Attorney, Agent, or Firm* — Knobbe Martens Olson & Bear, LLP

(57) ABSTRACT

A soilless system for high density plant growth includes a greenhouse structure; at least one elongate support member arranged substantially vertically in the greenhouse structure, the support member having a body having a flow channel defined therein; and a plurality of vertically spaced apart receptacles angularly disposed to the vertical axis of the body to receive a plant therein, the receptacles being in fluid communication with the flow channel; a fluid supply system in fluid communication with the flow channel to supply a fluid stream to the flow channel; and a fluid collection system to collect residual fluid that has flowed through the flow channel.

18 Claims, 5 Drawing Sheets

(51) Int. Cl.
  *A01G 9/24* (2006.01)
  *A01G 31/02* (2006.01)
  *A01G 9/14* (2006.01)
  *A01G 9/18* (2006.01)
  *A01G 9/26* (2006.01)
  *G05D 25/00* (2006.01)

(52) U.S. Cl.
  CPC .............. *A01G 9/26* (2013.01); *A01G 31/02* (2013.01); *G05D 25/00* (2013.01); *A01G 2031/006* (2013.01); *Y02A 40/264* (2018.01); *Y02P 60/216* (2015.11)

(56) References Cited

U.S. PATENT DOCUMENTS

| | | | |
|---|---|---|---|
| 2013/0118074 A1 | 5/2013 | Fulbrook | |
| 2014/0020292 A1* | 1/2014 | McNamara | A01G 9/16 47/66.6 |
| 2015/0223418 A1* | 8/2015 | Collins | A01G 31/02 47/62 R |
| 2016/0135398 A1* | 5/2016 | Mathieu | A01G 31/06 47/62 R |
| 2018/0014486 A1* | 1/2018 | Creechley | A01G 2/20 |

FOREIGN PATENT DOCUMENTS

| | | |
|---|---|---|
| JP | 63-119629 | 5/1988 |
| JP | 05-013154 | 2/1993 |
| JP | 05-076252 | 3/1993 |
| JP | 3034243 | 11/1996 |
| JP | 2002-297690 | 10/2002 |
| JP | 2003-189749 | 7/2003 |
| JP | 2006-213612 | 8/2006 |
| JP | 2007-020439 | 2/2007 |
| JP | 2011-250759 | 12/2011 |
| JP | 2012-016297 | 1/2012 |
| JP | 2012-206430 | 10/2012 |
| JP | 2013-504327 | 2/2013 |
| JP | 2014-217349 | 11/2014 |
| TW | M 492607 * | 1/2015 |
| WO | 2014/037958 A1 | 3/2014 |

OTHER PUBLICATIONS

Notification of Reasons for Refusal dated Aug. 29, 2017, of corresponding Japanese Application No. 2016-541246, along with an English translation.

* cited by examiner

HIGH DENSITY SOILLESS PLANT GROWTH SYSTEM AND METHOD

TECHNICAL FIELD

This disclosure relates to low carbon emission, soilless high density plant growth systems and methods.

BACKGROUND

Traditional farming includes methods wherein plants are planted in rows in soil, fertilized, watered and allowed to grow naturally until they reach a stage of growth in which they are harvested.

Such traditional farming methods have a number of limitations and disadvantages, for example, low density of plants per square meter thus requiring large areas of land to be farmed, and relative high carbon emission resulting from tractors and/or machinery used as well as extensive use of petrochemical based substances such as synthetic fertilizer, herbicides and/or pesticides.

Over time, such traditional systems/methods have been modified by covering the plants, for example, in tunnels made of a material that protects the plants from insects and the elements but, to a large extent, does very little to increase plant density and/or minimize carbon emission, or even trap carbon for use in the cultivation of plants.

High density farming methods in greenhouses such as hydroponics include a method of growing plants using mineral nutrient solutions in water without soil. Terrestrial plants may be grown with their roots in the mineral nutrient solution only or in an inert medium such as perlite, gravel, biochar, mineral wool, expanded clay pebbles or coconut husk.

Although hydroponics increases the yield per square meter and permits conditions for plant growth to be improved over traditional farming methods, hydroponics only addresses certain aspects of plant growth. The supply of nutrients to the roots of the plant and exposure to light and the density of plants is still quite limited as the plants are spread out in a single plane and typically have their roots extending into a pool of nutrient solution.

SUMMARY

I thus provide:

A soilless system for high density plant growth including:
a greenhouse structure;
at least one elongate support member arranged substantially vertically in the greenhouse structure, the support member having:
a body having a flow channel defined therein; and
a plurality of vertically spaced apart receptacles angularly disposed to the vertical axis of the body to receive a plant therein, the receptacles being in fluid communication with the flow channel;
a fluid supply system in fluid communication with the flow channel to supply a fluid stream to the flow channel; and
a fluid collection system to collect residual fluid that has flowed through the flow channel.

A system wherein the greenhouse structure may include a lumens enhancer to increase the amount of visible light therein.

A system wherein the lumens enhancer may be in the form of light penetrating material that includes reflective properties to allow sunlight to penetrate the structure, but to inhibit sunlight to reflect back to outer the structure.

A system wherein the lumens enhancer may be a reflective composition in the flooring of the greenhouse structure to reflect sunlight away from the floor towards the support members.

A system wherein the reflective composition may include a wavelength specific coating to reflect red and blue light spectrums away from the flooring.

A system wherein the lumens enhancer may be a light source that supplies light having a wavelength of about 800 to about 1000 nm.

A system wherein the greenhouse structure may include a temperature regulator to regulate temperature inside the structure.

A system wherein the temperature regulator may be in the form of any one or more selected from the group consisting of ventilation shafts, fans, a wetting system that wets the outer surface of the greenhouse structure, a spraying system that sprays a fine mist inside the structure and a radiator system.

A system wherein the elongate support member may be of generally wave shaped form.

A system wherein the elongate support member may be of substantially rectangular shape, in cross section.

A system wherein the receptacles may be located in a concave region of the support member.

A system wherein spacing formations may extend from an inner sidewall of the receptacle to position a seedling substantially centrally and away from the inner sidewalls of the receptacle.

A system wherein the elongate support member may include a channel that channels fluid streaming down the fluid channel towards a root zone of a plant contained in the receptacle.

A system wherein the channel may be in the form of v-shaped ridges extending from an inner surface of the elongate support member.

A system for high density plant growth wherein the elongate support member may include disperse elements that disperse fluid received from the channel.

A system wherein the support member may include a passage in fluid communication with the receptacle to introduce temperature and/or oxygen regulated air to the root zone of a seedling contained therein.

A system wherein the fluid supply system may include a carbon dioxide enriching apparatus that enriches the fluid stream with carbon dioxide.

A system wherein the carbon dioxide enriching apparatus may be in the form of a carbon dioxide scrubber arrangement configured to scrub carbon dioxide from a high carbon dioxide concentration stream.

A system wherein the high carbon dioxide concentration stream may be at least one selected from the group consisting of a cylinder of compressed carbon dioxide and an effluent stream from a chemical process that generates carbon dioxide.

A system wherein the fluid stream may have nutrients dissolved therein to promote plant growth.

A system wherein the fluid stream may have an organic anionic surfactant dissolved therein.

A soilless system for high density plant growth including:
a greenhouse structure;
at least one elongate support member arranged substantially vertically in the greenhouse, the support member having:

a body having a flow channel defined therein;
an arm extending at an angle of 1 to 179 degrees away from the body; and
a receptacle defined on an opposing end region of the arm, the receptacle, arm and body being in fluid communication with one another to allow fluid received by the receptacle to flow downstream the arm towards the body;
a fluid supply system that supplies a fluid stream to the receptacle; and
a fluid collection system that collects residual fluid that has flowed through the flow channel.

A system wherein the receptacle may include a spacing formation that spaces the plant away from an inner surface of the receptacle, substantially centrally therein.

A system wherein the receptacle may include a perforated basket element that receives a seedling plug therein.

A system wherein the fluid supply system may include a carbon dioxide enriching apparatus that enriches the fluid stream with carbon dioxide.

A system wherein the carbon dioxide enriching apparatus may be a carbon dioxide scrubber arrangement configured to scrub carbon dioxide from a high carbon dioxide concentration stream.

A system wherein the high carbon dioxide concentration stream may be selected one or more from the group consisting of a cylinder of compressed carbon dioxide and an effluent stream from a chemical process that generates carbon dioxide.

A system wherein the fluid stream may have nutrients dissolved therein to promote plant growth.

A system wherein the fluid stream may have an organic anionic surfactant dissolved therein.

A method of growing plants including:
enriching a nutrient fluid stream with carbon dioxide; and
supplying seedlings with the carbon dioxide enriched fluid stream in the absence of soil and in a high density arrangement.

A method wherein the fluid stream may have increased carbonic acid levels due to enrichment of the stream with carbon dioxide.

A system for long distance farming wherein control of the greenhouse environment and nutrient levels are controlled and managed via a computerized system located in a location different from where the greenhouse is located.

DETAILED DESCRIPTION

Figure 1:
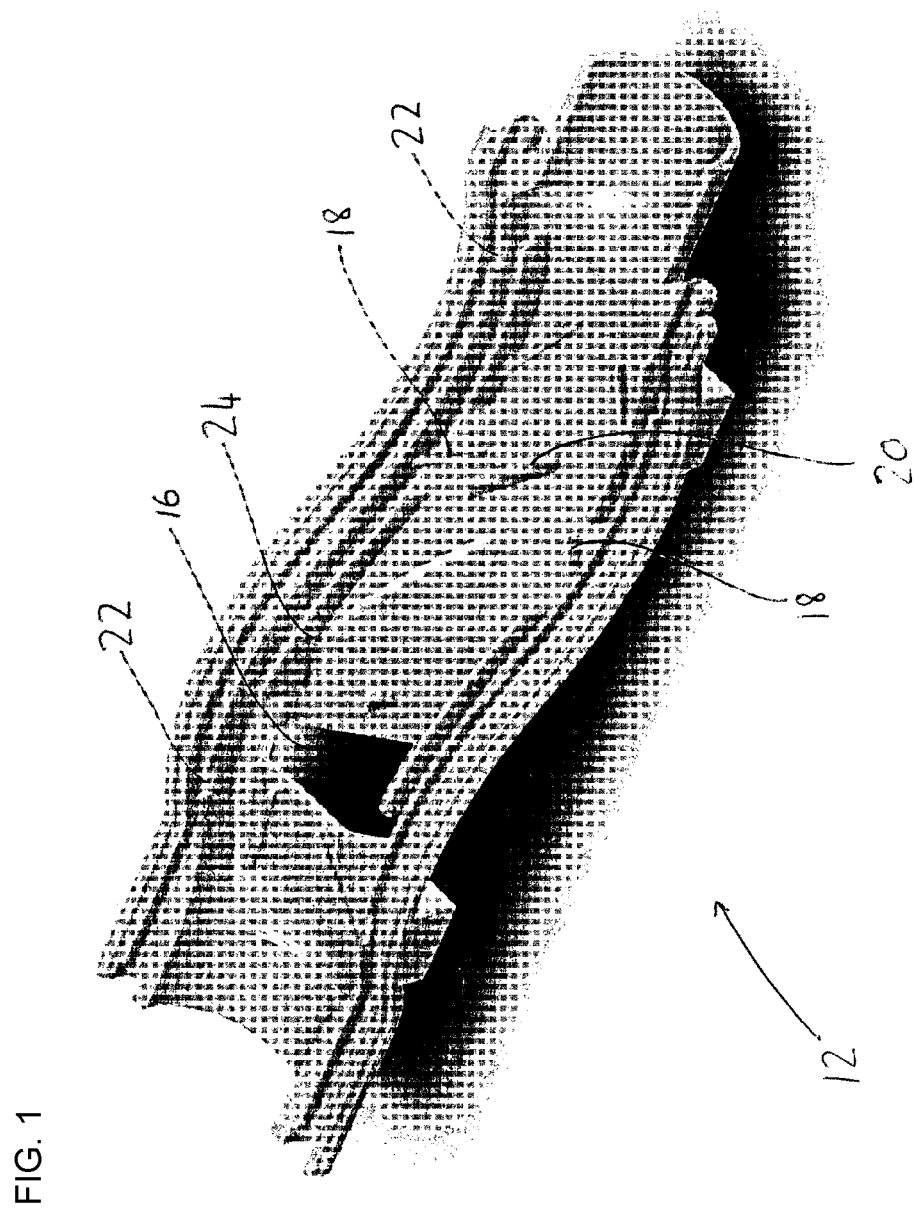
FIG. 1 shows one symmetric half of a first example of a support element.

A first example provides a soilless system for high density plant growth including:
a greenhouse-type structure;
at least one elongate support member arranged substantially vertically in the greenhouse-type structure, the support member comprising
a body having a flow channel defined therein; and
a plurality of vertically spaced apart receptacles angularly disposed to the vertical axis of the body that receives a plant therein, the receptacles being in fluid communication with the flow channel;
a fluid supply system in fluid communication with the flow channel that supplies a fluid stream to the flow channel; and
a fluid collection system that collects residual fluid that has flowed through the flow channel.

The greenhouse-type structure may comprise lumens enhancers that increase the amount of visible light in the structure. The lumens enhancer may be in the form of light penetrating material that allows a predetermined amount of sunlight to penetrate the structure. The material may include glass and/or clear polycarbonate resistant to ultraviolet radiation. The material may include reflective properties that allow sunlight to penetrate the structure, but to inhibit sunlight from reflecting back to the outer structure. The reflective material may include so called AGRI-FILM™ and/or so called LUMENMAX™.

A suitable filter may also be included in the material to inhibit wavelengths of red and blue light rays to enter the greenhouse structure.

The lumens enhancer may be in the form of a reflective composition in the flooring of the greenhouse structure to reflect sunlight away from the floor.

The reflective composition may be in the form of a red and blue color arrangement on the flooring of the greenhouse.

The lumens enhancer may include a light source preferably supplying light having a wavelength of about 800 to about 1000 nm.

The greenhouse-type structure may further include a temperature regulator that regulates the ambient temperature inside the structure. The regulator may be in the form of any one or more selected from the group consisting of ventilation shafts and/or fans, a wetting system that wets the outer surface of the structure and a spraying system that sprays a fine mist inside the structure.

The regulator may also include a conventional radiator system that regulates the ambient temperature inside the greenhouse.

The greenhouse structure may also include a pathogen controller that controls pathogen levels within predetermined ranges inside the structure. The pathogen controller may include a double air locked access to the structure, a flooring composition to collect undesirable particles and pathogens.

The elongate support members may be of generally wave shaped form and manufactured from any suitable material, preferably polyvinyl chloride and/or polyurethane.

The elongate support members may be of modular design and each support may be assembled from a number of one or more identical parts and which when assembled together form the support member.

Each support element has an opening portion that receives a plant such as a seedling therein which, when the support elements are assembled, form the vertically spaced apart openings of the support members.

Each support element in turn may comprise two symmetric halves which when assembled, define the support element.

The elongate support members may be of any suitable shape and size, preferably substantially rectangular shape, in cross section. It should be understood that the shape of the supports is not limited to a round cross section and they can be substantially square, rectangular, or any other shape in cross section and need not be of a constant cross section shape or size. The elongate support member may be of tubular shape and size.

The vertically spaced apart receptacles may be disposed at an angle of from 3 to 8 degrees to the vertical, typically around 5 degrees to the vertical.

The vertical spaced apart receptacles may be located in a concave region of the support member. A plurality of vertical spaced apart receptacles may be located out of register one another on opposing outer surfaces of the support member.

Spacing formations may extend from inner sidewalls of the receptacle into the opening defined by the receptacle, to space a seedling away from the inner wall of the receptacle, substantially centrally therein.

The elongate support members may include a channel that channels fluid streaming down the fluid channel towards a root zone of a plant contained in the receptacle.

The channel may be in the form of v-shaped ridges extending from an inner surface of the elongate support member.

The elongate support members may include disperser elements that disperse fluid received from the channel.

The elongate support member may include a passage in fluid communication with the opening to introduce temperature and/or oxygen regulated air to the root zone of a seedling disposed in the opening.

The fluid stream may have nutrients dissolved therein to promote plant growth.

The fluid stream may have an organic anionic surfactant dissolved therein.

The identical parts of the elongate support members may be secured together by clips, glue, plastics welding, or any other suitable means.

The carbon dioxide enriching apparatus may be a carbon dioxide scrubber arrangement configured to scrub carbon dioxide from a high carbon dioxide concentration stream such as a stream from a cylinder of compressed carbon dioxide or an effluent stream from a chemical process that generates carbon dioxide such as combustion.

The carbon dioxide is scrubbed from the high concentration carbon dioxide stream and the carbon dioxide enriched fluid may be used in the greenhouse to supply the seedlings with nutrients to create a fog, or for other uses.

The carbon dioxide enriched fluid stream may have plant nutrients dissolved therein.

The fluid stream may be trickled over the roots of the seedlings by trickling the fluid stream through the flow channel in the seedling supports.

A second example provides a soilless system for high density plant growth, the system including:
  a greenhouse-type structure;
  at least one elongate support member arranged substantially vertically in the greenhouse, the support member having a body having a flow channel defined therein;
  an arm extending at an angle of 1 to 179 degrees away from the body; and a receptacle defined on an opposing end region of the arm, the receptacle, arm and body being in fluid communication with one another to allow fluid received by the receptacle to flow downstream the arm towards the body;
  a fluid supply system that supplies a fluid stream to the receptacle; and a fluid collection system that collects residual fluid that has flowed through the flow channel.

The support members may be manufactured from any suitable plastics and/or synthetic material and may be of any suitable dark color.

The support members may comprise two symmetric elongate halves to be assembled together to define the support member.

A sealing formation that complementarily receives a sealing element therein, may be provided to seal off a space defined in-between the two symmetric halves when assembled.

The receptacle may include spacing formations that space the plant substantially centrally and away from an inner surface region of the receptacle.

The spacing formations may be in the form of protrusions extending from the inner surface of the receptacle.

The receptacle may be shaped and sized to in turn complementarily receive a perforated basket type element therein, which basket type element is configured to receive a seedling plug. The perforated basket type element allows roots of the seedling plug to extend down the arm during the growing process.

The receptacle may include a securing formation arranged at an upper end region thereof to receive and secure a fluid source in fluid communication therewith to trickle a nutrient enriched fluid to the receptacle.

Engagement formations defined on end regions of the body allow coupling of a plurality of soilless plant cultivating containers together, thereby defining a soilless plant cultivating pipe.

The engagement formations may take the form of male and female engagement formations, shaped and sized to sealably couple with one another to inhibit escape of fluid out of the soilless cultivating pipe, when assembled.

The body and the arm may comprise two symmetric halves to be assembled together to define the soilless plant cultivating container.

A sealing formation that complementarily receives a sealing element therein, may be provided to seal off a space defined when the two symmetric halves are assembled to define the soilless plant container.

Securing formations may further be provided to secure the assembled halves together in assembled mode.

The receptacle may include spacing formations that space the plant substantially centrally and away from an inner surface region of the receptacle.

The receptacle may be shaped and sized to in turn complementarily receive a perforated basket type element therein, which basket type element is shaped and sized to receive a seedling plug. The basket type element is perforated to allow roots of the seedling plug to extend down the arm during the growing process.

The receptacle may include a securing formation to receive and secure a fluid source in fluid communication therewith to trickle a nutrient enriched fluid source to the receptacle.

The spacing formations may be in the form of protrusions extending from an inner surface of the receptacle.

Engagement formations defined on end regions of the body allow coupling of a plurality of soilless plant cultivating containers together, thereby defining a soilless plant cultivating pipe.

The engagement formations may take the form of male and female engagement formations, shaped and sized to sealably couple with one another to inhibit escape of fluid out of the soilless cultivating pipe, when assembled.

The carbon dioxide enriching apparatus may be a carbon dioxide scrubber arrangement configured to scrub carbon dioxide from a high carbon dioxide concentration stream such as a stream from a cylinder of compressed carbon dioxide or an effluent stream from a chemical process that generates carbon dioxide such as combustion.

The carbon dioxide is scrubbed from the high concentration carbon dioxide stream and the carbon dioxide enriched fluid may be used in the greenhouse to supply the seedlings with nutrients, to create the fog, or for other uses.

The carbon dioxide enriched fluid stream may have plant nutrients dissolved therein.

The fluid stream may be trickled over the roots of the seedlings by trickling the fluid stream through the flow channel in the seedling supports.

A third example provides a soilless method for high density plant growth, the method including:
enriching a nutrient fluid stream with carbon dioxide; and
supplying seedlings with the carbon dioxide enriched fluid stream.

The method may include enriching the fluid stream with carbon dioxide until the pH of the fluid stream is adjusted to 6 to 7, typically 6.2. The fluid stream may have increased carbonic acid levels due to enrichment of the stream with carbon dioxide.

Prior to enriching, the fluid stream to be enriched has a low to very low dissolved solids such as distilled water, water recovered from condensers, from air conditioning systems and RO systems.

A fourth example provides a system for long distance farming, the system including a high density soilless system as hereinbefore described, characterized in that the control of the greenhouse environment as well as nutrient levels are controlled and managed via a computerized system, which system is located in a location different from where the greenhouse is located.

The different location may be a different country.

The computerized system receives data input from the greenhouse environment such as but not limited to in-house temperature, water nutrient levels, water carbonic levels and pathogenic levels.

The data received may allow the user of the computerized system to communicate corrective measures to be taken to optimize growing conditions.

Figure 5:
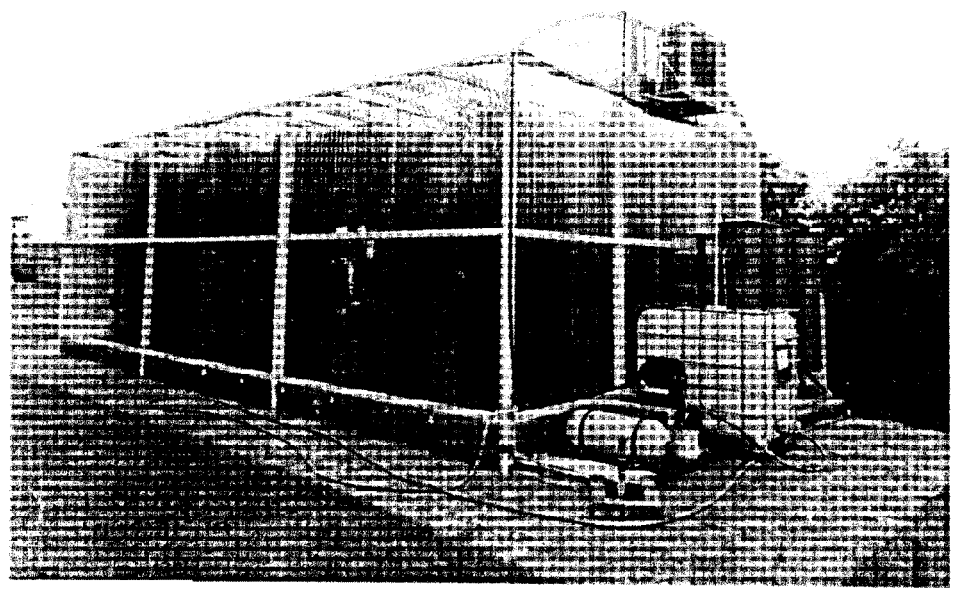
FIG. 5 shows a greenhouse.
Figure 6:
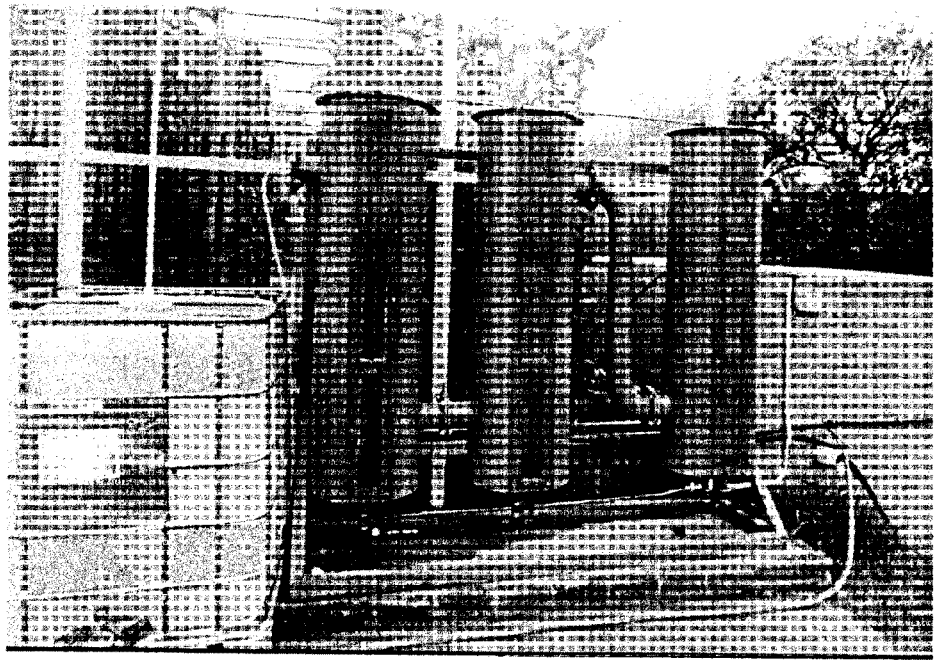
FIG. 6 shows a $CO_2$ scrubber system for use in enriching a fluid stream with carbonic acid and/or $CO_2$.

Referring now to the drawings, FIGS. 5 and 6 show a high density soilless system 10 also referred to as innovative controlled environment-accelerated growth enhancement chamber that grows leafy plants such as lettuce and herbs. The system 10 is not a hydroponic system as that term is understood since the roots are not permanently immersed in a nutrient fluid or in a nutrient fluid soaked medium. Accordingly, the system is rather closer to an aeroponic system since the roots are exposed to a trickle of nutrient rich fluid, whereas in traditional aeroponic systems the roots are sprayed with a nutrient rich fluid.

The greenhouse-type structure comprises a lumens enhancer to increase the amount of visible light in the structure. The lumens enhancer can be in the form of light penetrating material covering the structure to allow a predetermined amount of sunlight to penetrate the structure. The material can include glass and/or clear polycarbonate resistant to ultraviolet radiation. The material will typically also include reflective properties to allow sunlight to penetrate the structure, but to inhibit sunlight to reflect back to outer the structure, i.e., AGRI-FILM™. A suitable filter can also be included in the material to promote wavelengths of red and blue light rays to enter the greenhouse structure.

Reflective composition in the flooring of the greenhouse structure to reflect sunlight away from the floor will typically also be included to increase the visible sunlight inside the greenhouse. Coating the flooring in a red and blue color arrangement further promotes reflection of red and blue wavelength away from the flooring towards the plants.

To regulate the ambient temperature inside the greenhouse, ventilation shafts and/or fans, a wetting system for wetting the outer surface of the structure and a spraying system that sprays a fine mist inside the structure, can be applied. A conventional radiator system can also be incorporated to regulate the ambient temperature inside the structure.

The greenhouse structure also includes pathogen control measures to control pathogen levels within predetermined ranges inside the structure. The pathogen control measures include a double air locked access to the structure, and a flooring composition to collect undesirable particles and pathogens.

Figure 2:
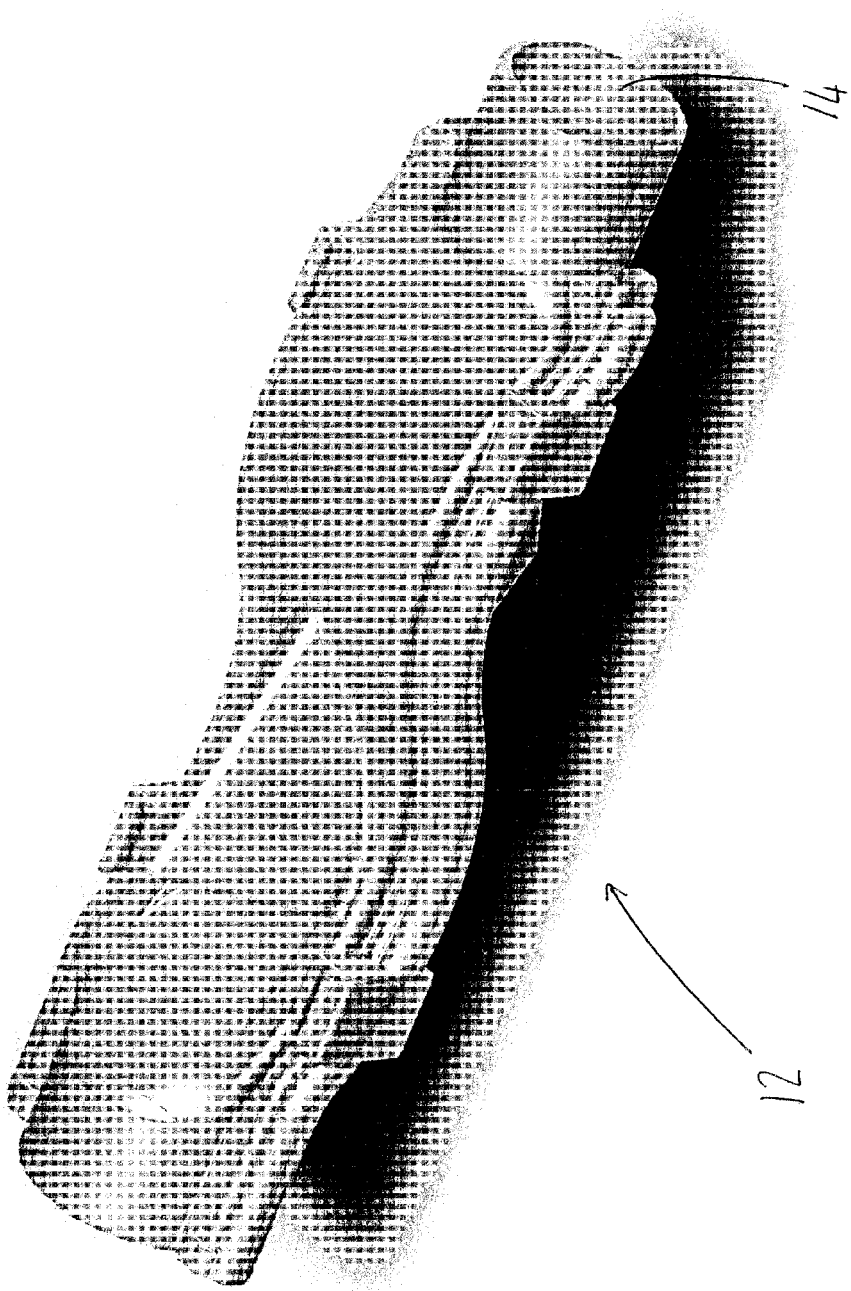
FIG. 2 shows the support element as shown in FIG. 1, when assembled.

Preferably, the greenhouse provides, in a grid layout, a plurality of wave shaped supports 12 as shown in FIGS. 1 and 2, rather than simply a straight vertical pipe portion, the supports having an internal flow channel 14 for a fluid or a vapor stream such as a nutrient and/or $CO_2$ enriched water stream, to flow between an upper and a lower portion thereof.

The wave shaped supports 12 have vertically spaced apart openings 16 angularly disposed to the vertical axis thereof, the opening being sized to receive seedlings therein so that, in use, seedlings are planted in the openings with their roots dangling into the flow channel, i.e., the openings are in flow communication with the flow channel so that the roots can contact a fluid trickling down the flow channel or a gas or a mist in the flow channel.

A fluid supply connects to an upper end of each of the supports so that the fluid trickles down the flow channel and brings the roots of the seedlings into contact therewith.

At the bottom of the supports and, in flow communication with the bottom outlets of the flow channels, a fluid collection system collects residual fluid that has trickled through the supports.

The openings for the seedlings are disposed at an angle of around 5 degrees to the vertical as this is believed to provide a desired amount of sunlight for the seedlings.

In the example, the supports are of modular design and each support is assembled from a number of identical parts which when assembled together form the support. This has the advantage that only a single mold needs to be made and the vertical tubular supports can be assembled from a number of identical parts which reduces the costs and complexity thereof. However, it is not inconceivable that there may be two or more part types assembled to form a unit from which the tubular supports are assembled.

Any number of identical parts may be secured together to form a vertical support of a desired length. Likewise, the dimensions of the identical parts can be selected to form a vertical tubular support of any desired equivalent diameter, for example, 50 mm and/or to match any standard piping size available.

Thus, the plant and/or seedling supports of the system have the advantage that there is directional flow of the nutrient fluid and this is assisted by having fins 18 inside the flow channel as well as the shape thereof, which ensures that the nutrient fluid will trickle over the root zone of a seedling planted therein. Dispersing element 20 ensures that fluid is dispersed to increase oxygenation thereof.

Temperature control in the receptacle and/or plant root zone is achieved by the passage and slot formation 22 to allow oxygenated air to be introduced to the root zone of the plant. The control of temperature in the preferred region of about 16 to about 25° C. around the plant root zone is achieved by introduction of air of the required temperature, down the passage, entering the root zone via the slot formations. The passage and slot formation contributes to the energy efficiency of the system in that the temperature around the root zone is regulated without the need to control the complete environment inside the greenhouse structure. Air of the required temperature will be introduced intermittently through the passage via the slots to the root zone to facilitate maximum plant growth.

The guiding formations 24 inhibits the escape of fluid out of the receptacle should the receptacle be overgrown by plant roots thereby obstructing the flow of fluid.

Disposition of the openings at 5 degrees to vertical is preferred for latitude position on globe and angle of sunlight.

Figure 3:
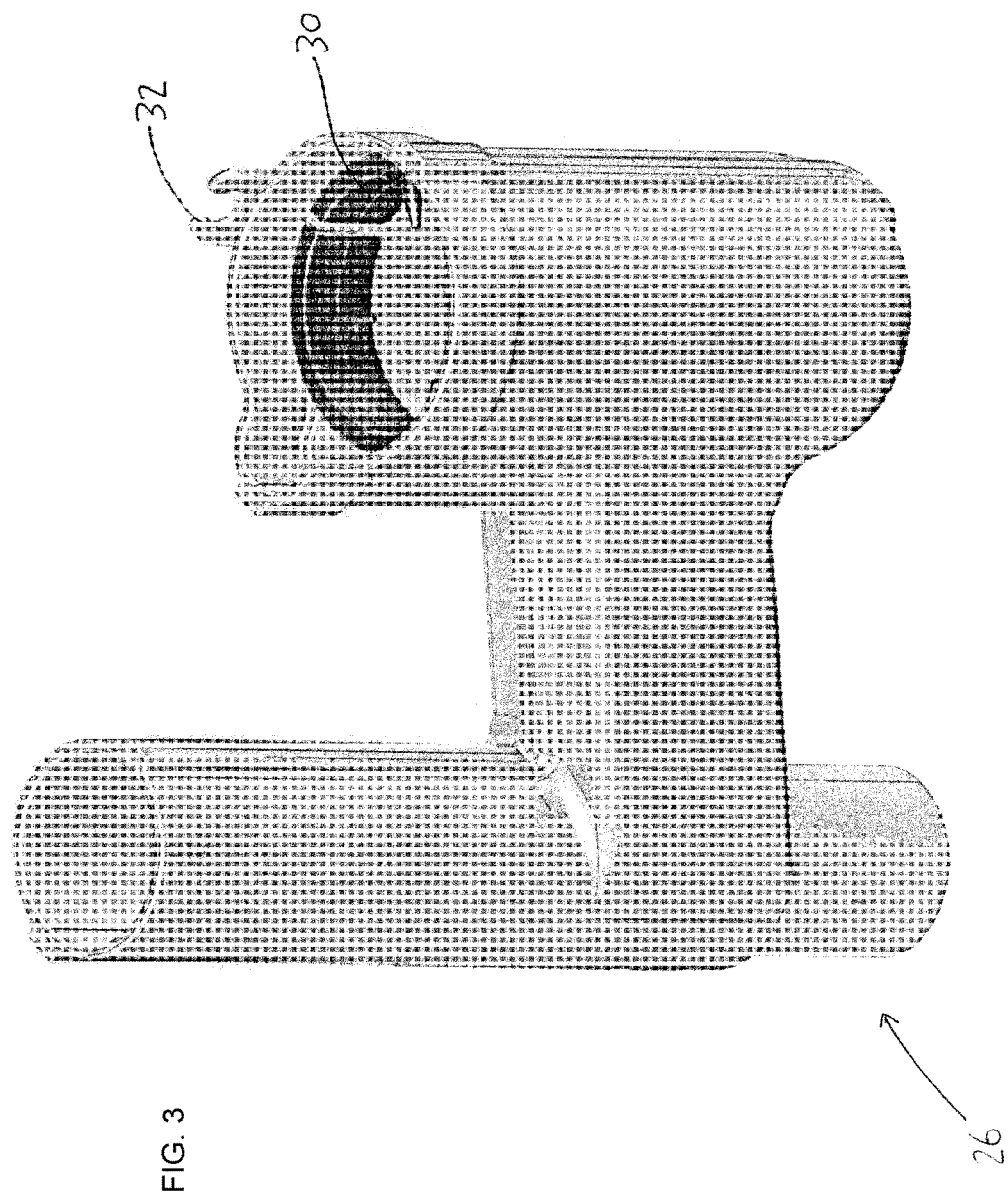
FIGS. 3 and 4 show a second example of the support member.
Figure 4:
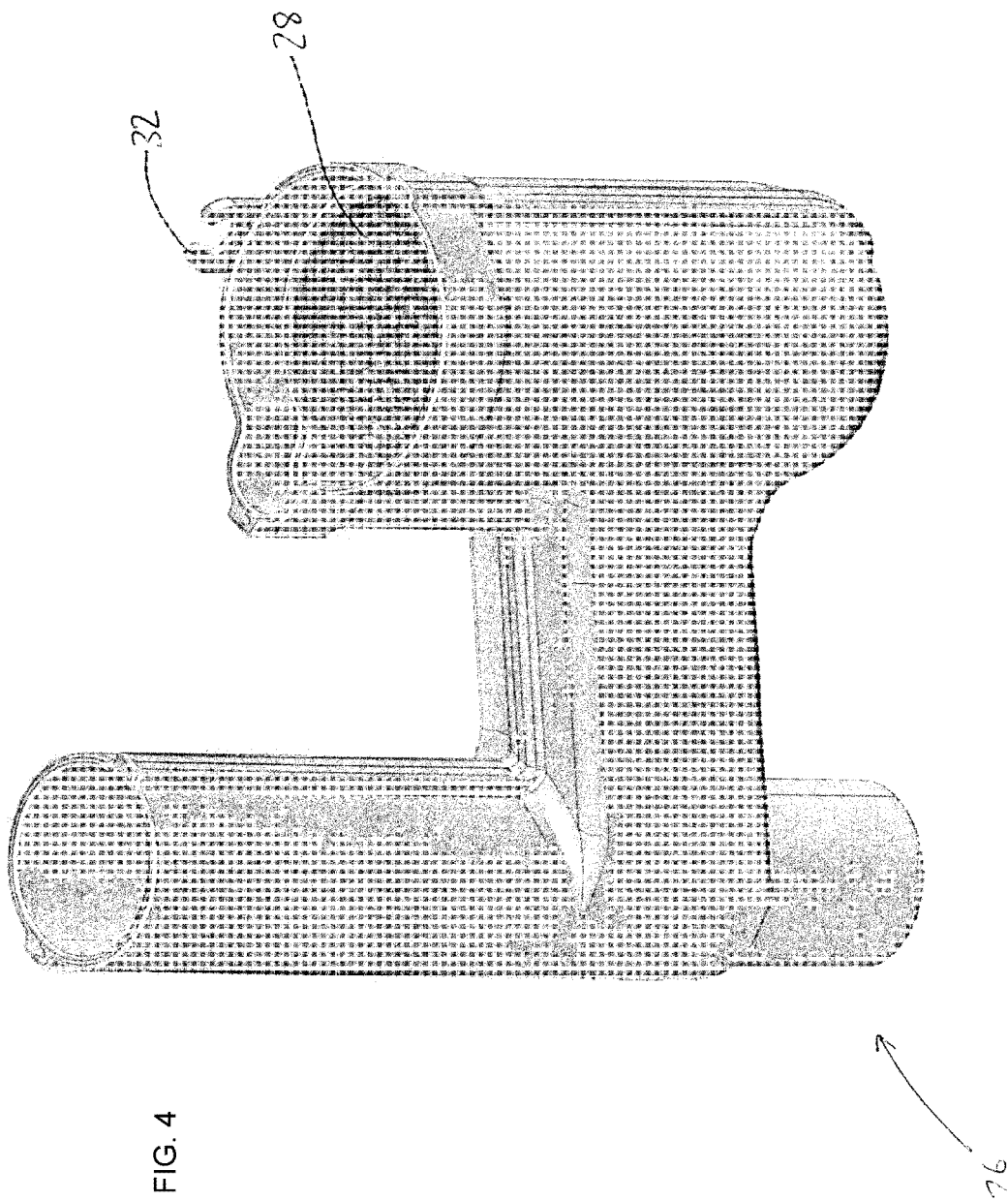

Certain plants such as cauliflower become top heavy during growing and to prevent the plant from falling out of the growing container, the support members 26 as depicted in FIGS. 3 and 4 are provided. This example of the support member also includes a perforated receptacle 28 to secure the seedling. This example further includes spacer 30 to space the plant relatively centrally the receptacle. A securing formation 32 allows a fluid source to be connected to the rim of the receptacle thereby allowing fluid to trickle downward the receptacle.

In the system, as the fluid flow is vertically from top to bottom, the mixing of fertilized hydroponic or aeroponic feed and gasses is enhanced due to the trickle flow.

The system provides for maximum light penetration through the system, thus when the vertical supports are placed in close proximity as in a greenhouse, some of the pipes are at risk of being in the shade of other pipes and thus the shape and form of the vertical supports of the system is such that it minimizes the shade risk for neighboring vertical tubular supports, which are known as vertical growth stacks.

The system thus provides for a density of about 100 to about 1000 percent of current growth systems, or more and typically permits for about 200 to about 400 plants per square meter although this can be increased by use of artificial lighting.

The system thus allows for directional gas enhancement and growth medium recirculation in the same system.

The system also allows for good airflow through the growing environment with the vertical tubular supports form allowing for good air flow through the rows of growing plants.

By harvesting water using adiabatic distillation and condensation methods, conventional atmospheric water generators and treated water and/or fluid in circulation by exposure to UV and ozone, a relatively self-sustainable plant growth environment is created, wherein the self-sustainability is aided by the close loop circulation of fluid/water inside the greenhouse.

Without limiting the scope of my systems or methods or how they may be used, the system can conveniently be used as follows:

A $CO_2$ rich stream is scrubbed into a water stream treated with M3T™ surfactant to form carbonic acid and higher concentration $CO_2$ in the water thus the water exiting the scrubber includes dissolved $CO_2$ and carbonic acid.

The $CO_2$ can be from industrial processes or captured from the air, e.g., Carbon Capture and Storage.

The scrubber water enriched with carbonic acid and/or $CO_2$ is used as the water base for the vertical growing stack root side supply. The water with the dissolved carbonic acid is preferably at a pH of 6.2 but can be at a pH of about 6 to about 7. Water used to form the carbonic acid must have very low dissolved solids, e.g., distilled water, water recovered from condensers of air-conditioning system and the water has a maximum temperature of about 25° C.

In the greenhouse, the temperature should be about 17 to about 20° C. with either natural circulation or through mist spray.

Thus, in normal operation of the system, the following steps are followed:

1. For a period of 3 days seedlings, seeds, cuttings or bulbs are first so-called "hardened off" and sterilized in a controlled environment incubator wherein they are exposed to a combination of artificial light, ozone, ultraviolet light (UV) and infra-red light (IR), while constantly sprayed with a water mist containing a combination of organic fungicide, M3T™, citrus oil, green tea extract, organic pesticide and organic fungicide. This step is necessary to prepare the plant for second growing phase as described hereunder, and also to reduce the risk of fungus or insect attack. The water can be sterilized with ozone and UV and, optionally, passed over a magnet to magnetically treat the water. The mist is an ultrafine mist. The water or the mist may be ionized, e.g., by polarizing the spray nozzle. The droplet size is about 1 to about 100 micron.

2. The seedlings are transferred to the growth environment, e.g., a greenhouse, which includes:

a. Removable hail cover to protect against hail damage and also to act as shading if necessary;

b. Water distribution system on the roof of the greenhouse via a system of interconnected pipes and nozzles to spray water on the roof of the tunnel when needed;

c. Climate control system including a conventional water cooler, chiller, infrared red light source as well as a humidifier for controlling the ambient temperature to about 15 to about 24, ideally 17° C., as well as the relative humidity inside the tunnel;

d. Heating mechanisms, for example, boiler and pipe configurations to increase the in house temperature as well as the water temperature when such temperatures reach 5° C.;

e. Reflectors preferably in the form of polycarbonate sheeting including reflector elements, positioned inside the tunnel to reflect incoming light inside the tunnel to increase the light density inside the tunnel by about 5 to about 17%, over and above ambient surrounding light;

f. Floor cover consisting of a reflective material and/or coating in silver and/or having anti-microbial properties, to obtain 200 to 1000 watt/$m^2$, typically around (50 watt/$ft^2$) 500 watt/$m^2$. The ideal light wavelength is about 400 to about 700 nm;

g. The roof of the tunnel hingedly connects to allow the roof to be partially removed to ventilate the greenhouse should the temperature and/or humidity reach maximum levels;

h. A double entrance system creating an enclosed cubicle between the two doors. The cubicle having a floor configured to hold disinfectant mixture consisting of an aqueous mixture of green tea extract, citrus oil, M3T, organic fungicide to disinfect feet of people entering the tunnel;

i. The cubicle further connects to a source of air supply to maintain a relative positive pressure inside the cubicle and prevent introduction of foreign airborne substance into the cubicle and the tunnel;

j. Temperature and humidity inside the tunnel is controlled via a centralized remote controlled system where the system receives input on parameters such as temperature and humidity and the control is achieved via, but not limited to, the climate control unit, spraying of mist inside the tunnel and partial removal of the roof;

k. Water harvesting system to harvest water as a by-product of the watercooler system as well as from the atmosphere by adiabatic distillation and condensation methods such as SKYWATER™.

l. Water treatment system that treats water kept in a reservoir to apply to the roots of the growth stack.

m. Blowers or fans running at typically a rate of about 2 m/s (range about 1 to about 5 m/s) to enable continuous air flow in the greenhouse to prevent the build-up of gasses exchanged during plant propagation, typically $CO_2$ and oxygen.

n. Solar panels that generate electricity to drive the motor driven apparatus such as the water cooler, blowers and fans such as the SMART POWER™ concept.

o. Purpose made HORTIMAX™ to monitor real time plant propagation process and early detection of nutrient loss, Ph fluctuation, pathogens outbreak to allow for remote management.

p. Hydrathron for electrochemical treatment of pathogens such as *Pythium, Phytophthora* and *Fusarium*, by releasing colloidal silver and hydrogen peroxide into the spray mist and/or the trickle water supply.

The water treatment system consists of a UV light source, electro-magnetic cation exchanger, ozone source, organic filters for removing organic matter, biofilters, sand filters, nanotech filters, carbon activated or oilshale filters, ultrasound, aeration via cascade means and/or ventury, reverse hydro-chemical activation to enrich water oxygen as well as with trace elements such as copper and iron.

The water reservoir is a sealed unit in fluid communication with the system of interconnected pipes for recollection of water trickled down the pipe modules, the reservoir further including a source of air creating a positive air pressure inside the reservoir, allowing for directional gas enhancement and growth medium recirculation in the same system with a counter flow of gasses flowing up in the flow channel in an opposite direction to nutrient flow.

Positioning of the vertical growth stacks (vertical tubular supports) is selected to permit the plants to have maximum exposure of their leaves to sunlight. The growth environment is designed to restrict losses of gasses and heat from the greenhouse so that the greenhouse operates under a slight positive pressure. IR and UV lights are used to compensate for lack of sunlight due to weather conditions.

A fogging system is used to spray a fine mist of water, or water with M3T™ and seaweed extract onto the leaves to improve cell structure. The mist spray serves four functions i.e. temperature control, leaf feeding, pest control/pathogen control, and to control humidity.

Nutrients, i.e., macro elements such as organic NPK are mixed with water which has been treated with M3T™, and this is then supplied to the root side of the vertical growth stack where it trickles through the vertical tubular supports over the roots and keeps them wetted with the nutrient enriched water. Micro-elements can be provided through electrochemical processes, for example, dissolving metal electrodes into water, e.g., iron and magnesium via reverse hydro chemical activation.

Prior to harvest, the plants are treated for a period of about 48 hours with a mixture of anionic surfactant, organic Ph stabilizer, organic anti bacteria and organic preservative resulting in an increase in hydro carbohydrate levels and BRIX content of the plant leaves.

Harvesting is performed during night time and plants are cut using pressurized air supply. All cutting and instruments are treated with a mixture of M3T™ and ZOONOCIDE™ or similar. From point of harvest until transport temperature is kept below about 10° C. All personnel wear protective wear to limit contamination. Packed product is stored between about 3 to about 7° C.

To promote shelf life and freshness, a composition including nutrients and moisture, is added in the packaging. During transportation, the plant will continue absorbing moisture and nutrients from the composition.

To further enhance growth in the greenhouse, the plants are exposed to a predetermined range of sound waves, known as acoustic grow.

The use of oxidation process, commonly known as AOP, further enhances the quality and purity of the nutrient enriched fluid.

The use of an anionic surfactant such as M3T™ herein described promotes wetting of roots, thereby increasing osmosis, diffusion, alleviation of the root pressure differential with a resultant increase in the rate of water uptake with a decrease in energy expenditure in doing so.

M3T™ is a surfactant product available from Marine 3 Technologies (Pty) Ltd in South Africa.

My systems and methods are advantageous in that they are directed to a low carbon emission high density plant cultivation system and method wherein the low carbon emission is attributed to factors such as the use of solar panels to generate electricity, reflective material to enhance visible light inside the tunnel, incorporation of airflow passages with slot formations in the vertical plant supports for localized regulation of temperature around the plant root zone, no petrochemical based substances such as synthetic fertilizer, pesticides and/or herbicides, commonly used in traditional farming practices. The carbon enriching scrubber apparatus further contributes to low carbon footprint of the system by acting as a carbon sink, wherein the scrubbed carbon is converted into edible plant material.

The invention claimed is:

1. A soilless system for high density plant growth comprising:

a greenhouse structure;

at least one elongate support member arranged substantially vertically in the greenhouse structure, wherein the elongate support member is substantially wave shaped, the support member comprising:

a body having a flow channel defined therein; and a plurality of vertically spaced apart receptacles angularly disposed to a vertical axis of the body to receive a plant therein, the receptacles being in fluid communication with the flow channel;

a fluid supply system in fluid communication with the flow channel to supply a fluid stream to the flow channel; and a fluid collection system to collect residual fluid that has flowed through the flow channel.

2. The system as claimed in claim 1, wherein the greenhouse structure includes a lumens enhancer to increase the amount of visible light therein.

3. The system as claimed in claim 2, wherein the lumens enhancer is a light penetrating material having reflective properties that allow sunlight to penetrate the structure, but inhibit sunlight from reflecting back to outer the structure.

4. The system as claimed in claim 2, wherein the lumens enhancer is a reflective composition in the flooring of the greenhouse structure that reflects sunlight away from the floor towards the support members.

5. The system as claimed in claim 4, wherein the reflective composition comprises a wavelength specific coating that reflects red and blue light spectrums away from the flooring.

6. The system as claimed in claim 2, wherein the lumens enhancer is a light source that supplies light having a wavelength of about 800 to about 1000 nm.

7. The system as claimed in claim 1, wherein the receptacles are located in a concave region of the support member.

8. The system as claimed in claim 7, wherein spacing formations extend from an inner sidewall of the receptacle to position a seedling substantially centrally and away from the inner sidewalls of the receptacle.

9. The system as claimed in claim 1, wherein the elongate support member includes a channel that channels fluid streaming down the fluid channel towards a root zone of a plant contained in the receptacle.

10. The system as claimed in claim 9, wherein the channel comprises v-shaped ridges extending from an inner surface of the elongate support member.

11. The system as claimed in claim 1, wherein the elongate support member includes dispersion elements that disperse fluid received from the channel.

12. The system as claimed in claim 1, wherein the support member includes a passage in fluid communication with the receptacle to introduce at least one of temperature and oxygen regulated air to the root zone of a seedling contained therein.

13. The system as claimed in claim 1, wherein the fluid supply system includes a carbon dioxide enriching apparatus that enriches the fluid stream with carbon dioxide.

14. The system as claimed in claim 13, wherein the carbon dioxide enriching apparatus is a carbon dioxide scrubber arrangement configured to scrub carbon dioxide from a high carbon dioxide concentration stream.

15. The system as claimed in claim 14, wherein the high carbon dioxide concentration stream is at least one selected from the group consisting of a cylinder of compressed carbon dioxide and an effluent stream from a chemical process that generates carbon dioxide.

16. The system as claimed in claim 1, further comprising a computerized system located in a location different from a location where the greenhouse is located and adapted to control and manage a greenhouse environment and nutrient levels.

17. The system as claimed in claim 1, wherein the flow channel is adapted to provide directional flow of a nutrient fluid inside the flow channel such that, in use, the nutrient fluid trickles over a root zone of a seedling planted therein.

18. The system as claimed in claim 1, wherein the flow channel further comprises fins adapted to assist in directional flow.

* * * * *